May 14, 1963

P. BERGONZO 3,089,160

AUTOMATIC LATHE FOR CUTTING THREADS

Filed Oct. 30, 1959

INVENTOR

PIERRE BERGONZO

By Irwin S. Thompson

ATTY.

May 14, 1963 P. BERGONZO 3,089,160
AUTOMATIC LATHE FOR CUTTING THREADS
Filed Oct. 30, 1959 3 Sheets-Sheet 2

INVENTOR
PIERRE BERGONZO
By Irwin C. Thompson
ATTY.

3,089,160
AUTOMATIC LATHE FOR CUTTING THREADS
Pierre Bergonzo, Cologny, Geneva, Switzerland, assignor to Tarex S.A., Geneva, Switzerland, a corporation of Switzerland
Filed Oct. 30, 1959, Ser. No. 849,969
Claims priority, application Switzerland Nov. 28, 1958
7 Claims. (Cl. 10—101)

The present invention has for its object a machine for cutting a thread on a piece driven in rotation by the spindle of an automatic lathe, by means of a tool carried by a cross-slide carriage controlled by the cam-shaft of the lathe and provided with a thread cutting device connected through transmission members to the spindle of the lathe, characterized by the fact that one displaces the slides of the carriage from a rest position to a first working position then one actuates the thread cutting device with a first transmission ratio to cut a first thread presenting a first pitch and a first diameter, then, after completion of said thread, one displaces the carriage to a second working position and modifies simultaneously the transmission ratio between the thread cutting device and the spindle of the lathe to cut a second thread presenting another pitch and another diameter, and lastly, one causes after completion of the second thread the return of the slides of the carriage to their rest position.

Said invention has also for its object an automatic lathe for carrying out said thread cutting. Said lathe comprises a cross-slide carriage actuated by a cam-shaft and provided with a thread cutting tool controlled by a thread cutting device carried by said carriage and connected through transmission members to the spindle of the lathe, characterized by the fact that the thread cutting device is connected to the spindle through two gear trains presenting different transmission ratios and through a clutch controlled by a cam carried by the cam-shaft, said clutch causing at first the driving of the thread cutting device by the intermediary of the first gear train to cut the first thread, then the driving of said thread cutting device by the intermediary of the second gear train to cut the second thread.

The lathe according to the invention allows one to cut at will external or internal threads by mounting on the lathe the cams designed for each of the cases.

The accompanying drawings represent schematically and by way of example an embodiment of an automatic thread cutting lathe according to the invention. In said drawings, only the parts required for an understanding of the invention are illustrated.

FIG. 1 is a perspective view partially in section of the left-hand portion of the lathe.

Figure 2:
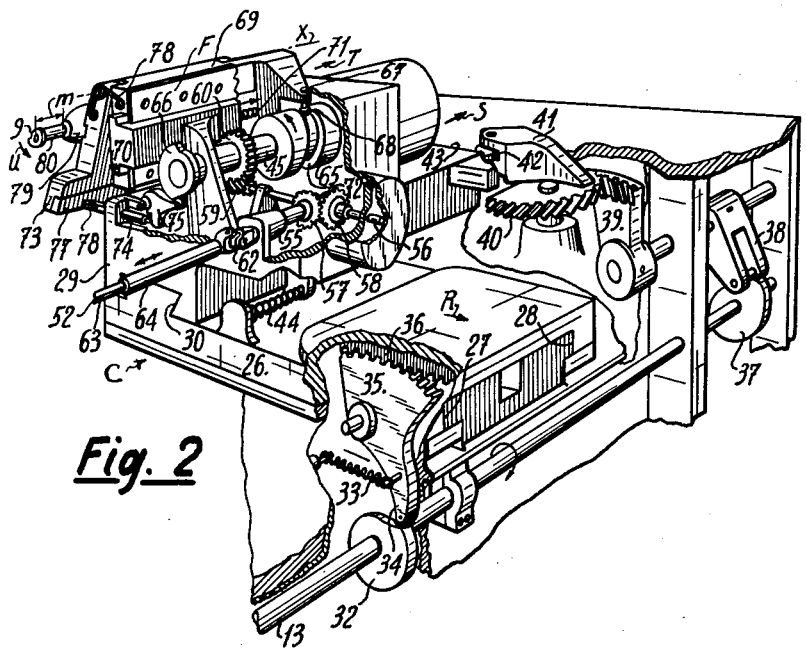
FIG. 2 is a perspective view partially in section of the right-hand portion of the lathe.

The lathe comprises a bed 1 on which is mounted a spindle 2 driven in rotation by a motor by the intermediary of a mechanical transmission not shown. A workpiece 3 to be threaded, on which two external threads of different pitch and diameter are to be cut, is secured in a chuck 4, mounted on the spindle 2. A helical gear 5 made fast with the spindle 2 meshes with a helical wheel 6 fixed at one end of a driving shaft 7 rotatively mounted in a bearing 8 secured to the bed 1. Said shaft 7 controls, by the intermediary of a kinematic connection hereinafter described, a thread cutting device F carrying a cutting tool 9.

A clutch E (for example a toothed or dog-clutch), which presents a driving part 10 secured to the driving shaft 7 and a driven part 11 secured to a secondary shaft 7a establishes or interrupts the kinematic connection connecting the spindle 2 to the thread cutting device F. The engagement and the disengagement of the two parts 10 and 11 of the clutch are controlled by a grooved cam 12 secured to a cam-shaft 13 rotatively mounted on the bed 1 and driven by a bevel gearing 14, 15 actuated by the motor of the lathe. Said cam 12 controls, by the intermediary of levers 16, 17 and of a rod 18, a sector 19 secured on a rotary shaft 20 carried by the bed 1. Said sector is adapted to occupy two different angular positions, defined by two peripheral notches 21, 22 co-operating with a roller 23 rotatively mounted on the bed 1 of the lathe and maintained in contact with the edge of the sector 19 by a return spring 24. A lever 25, secured to the end of the shaft 20, actuates the driven and shiftable part 11 of the clutch E and holds it—according to the position occupied by the sector 19—either in engaged position with the driving part 10, or in disengaged position.

The lathe comprises further a cross-slide carriage C comprising a lower slide 26 transversely displaceable along guide-ways 27, 28 carried by the bed 1 and an upper slide 29 longitudinally displaceable along a guide-way 30 carried by the lower slide. A first flat cam 32 fastened on the cam-shaft 13 and a return spring 33 ensure the transversal displacement to and fro of the slide 26 by the intermediary of a lever 34 provided with a toothed sector 35 meshing with a rack 36 made fast with the slide 26.

A second flat cam 37, fastened likewise onto the cam-shaft 13, ensures the to and fro longitudinal displacement of the upper slide 29 by the intermediary of a lever 38, of two toothed sectors 39, 40 and of a pusher 41, made fast with the toothed sector 40 and provided with a contact roller 42 rolling on the back face 43 of the slide. Said slide is maintained in constant contact with the roller 42 through the action of a return spring 44 bearing on the lower slide 26. The upper slide 29 carries the thread cutting device F which comprises a horizontal shaft 45 rotatively mounted on the slide 29 and constituting the end of the kinematic connection connecting the spindle 2 to the thread cutting device F.

Figure 4:
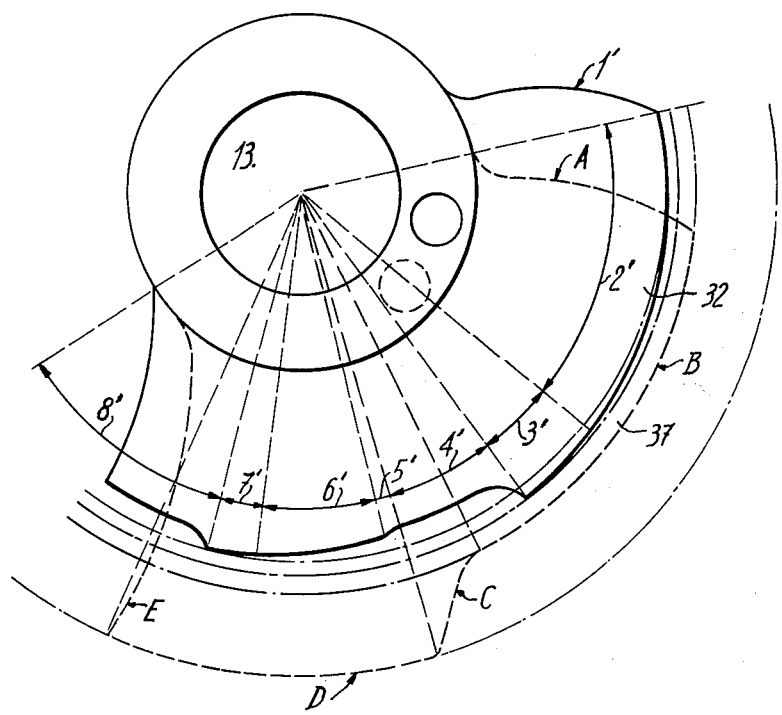
FIG. 4 is a view of certain cams of the lathe.

FIGURE 4 shows a view of cams 32 and 37 along the direction of a plane perpendicular to the axis of cam shaft 13. Following is a description of the operation of cams 32 and 37.

The cam 32 has a first portion 1′ constituting a quick rise which corresponds to the setting in working position of the slide 26. Cam 32 has a second portion 2′ constituting a slow rise. Thus, as the tool is making each of its successive passes to cut a thread, the tool slide 26 is being continuously moved by this second portion of cam 32 with the result that the tool is being fed radially deeper into the work as it makes each pass. The thread thus produced would therefore not be of uniform depth if there were not the third portion 3′ of the cam 32 which is concentric to the cam shaft and which corresponds to the few last finishing passes. During these last finishing passes, the tool is not fed into the work during its pass so that the thread is machined to have the same depth on all its length.

Now, in the use of a double thread as is the case in the present invention, cam 32 shows after its third portion 3′ (the concentric portion) a fourth portion 4′ which corresponds to the return of the slide 26 to a position for which the tool is placed just before its working position for the second thread; a fifth portion 5′ constituted by a quick rise of low amplitude corresponding to the setting in working position of the slide 26 for the second thread; a sixth portion 6′ constituted by a slow rise corresponding to the continuous feeding of the tool in the workpiece for cutting the second thread; a seventh portion 7' constituted by an arm of circle concentric to the cam shaft corresponding to the last finishing passes in order to machine the whole length of the second thread at a same depth; and an eighth portion 8' corresponding to the return in rest position of slide 26.

The cam 37 for the displacements of upper slide 29 comprises a first portion A constituted by a quick rise for the setting in working position of the slide 29 for the first thread that has to be cut; a second portion B constituted by an arc of circle concentric to the cam shaft during the effective cutting of the thread (portions 2' and 3' of cam 32); a third portion C constituted by a quick rise for the setting in working position of slide 29 for the cutting of the second thread, said portion being located such that this movement takes place during portion 4' of cam 32, a fourth portion D constituted by an arc of circle concentric to the cam shaft during the effective cutting of the second thread (portions 6' and 7' of cam 32), and a fifth portion E corresponding to the return in rest position of the slide 29.

Said kinematic connection is constituted of the following elements:

(a) a first gear train 46 carried by the bed 1. Said gear train is driven by the secondary shaft 7a and comprises a wheel 49 fixed on the shaft 7a, an intermediary wheel 50 rotating freely on a fixed shaft 47 and a wheel 51 rotating freely on an outgoing shaft 48;

(b) a second gear train 90 carried by the bed 1. Said second gear train comprises a wheel 91 fixed on an extension of the secondary shaft 7a, an intermediary wheel 92 rotating freely on a fixed shaft 93 carried by an arm 94 pivoted at the end of a pin 95 and a wheel 96 rotating freely on an extension of the outgoing shaft 48. The position of the shaft 93 along the arm 94 is adjustable;

(c) a double clutch mounted between the wheels 51 and 96 on the outgoing shaft 48. The movable part 97 of said double clutch is axially displaceable along the shaft 48 but is made angularly fast with said shaft. Said movable part 97 comprises at each of its ends radial teeth 98, 99 adapted to engage with corresponding teeth 98a, 99a carried respectively by the wheels 51 and 96. Thus, according to the axial position occupied by the movable part 97, the outgoing shaft 48 is driven by one or the other of the clutches 98, 98a and 99, 99a so that the thread cutting device F is connected to the spindle through one or the other of the two gear rains 46 and 90 the transmission ratios of which are different;

(d) a shaft 52 driven at one of its ends by the outgoing shaft 48 of the gear trains 46 and 90, by the intermediary of two bevel pinions 53, 54. The other end of said shaft 52 rotatively mounted in a bearing 55 made fast with the upper slide 29 is drawn along in the longitudinal and transversal displacements of said slide;

(e) a horizontal shaft 56 rotatively mounted on the slide 29 and driven by the shaft 52 by the intermediary of bevel pinions 57, 58. Said shaft 56 drives in rotation the horizontal shaft 45 of the thread cutting device F by the intermediary of a worm wheel gearing 59, 60.

To enable the end of the shaft 52 mounted in the bearing 55 to follow the displacements of the slide 29, said shaft 52 is provided with two universal joints 61, 62 mounted between the two bevel pinions 53, 54 carried by the bed 1 and the slide 29 and two splined parts 63, 64 sliding one on another but made angularly fast.

The lathe comprises further a control device for the movable part 97 of the double clutch. Said device comprises an interchangeable control cam 100 fixed on the cam-shaft 13 and on the periphery of which rolls a roller 101 mounted at the end of an arm 102 of a double- armed lever 103 pivoted on a shaft 104 parallel to the cam-shaft 13 and fixed to the bed 1.

The second arm 105 of said lever 103 is submitted to the action of a return spring 106 tending to maintain the roller 101 in contact with the control cam 100. Said second arm 105 transmits its angular displacements to an arm 107 of a second double-armed lever 108 on which it is articulated and which is pivoted at 109 on the bed 1. The second arm 110 of the lever 108 comprises at its end a toothed sector 111 which meshes with a second toothed sector 112 pivoted at 113 on the bed 1. Said second toothed sector 112 is mechanically connected through a rod 114 to a finger 115 engaged in a peripheral groove 116 of the movable part 97 of the double clutch so that an angular displacement, imparted by the intermediary of the levers 103 and 108 to said toothed sector 112 by the control cam 100, produces an axial displacement of said movable part 97. The control cam 100 comprises two sectors o and p. The first sector o, which has the smaller radius, controls the engagement of the clutch 98, 98a and causes thus the driving of the outgoing shaft 48 at a first speed, whilst the second sector p having a greater radius controls the engagement of the clutch 99, 99a and causes thus the driving of the outgoing shaft 48 at a second speed.

On the horizontal shaft 45 of the thread cutting device F are fixed two machining cams, that is a grooved drum-cam 65, called "master," and a flat cam 66. The master 65 actuates, by the intermediary of a finger 67 provided with a roller 68, an auxiliary longitudinal slide 69 sliding on guideways 70 secured to the upper slide 29. A return spring 71 bearing on the slide 29 exerts a thrust on the auxiliary longitudinal slide 69, so as to maintain the roller 68 in contact with the rear face 72 of the groove of the master 65. Effectively, it is indispensable for working out a precision thread to suppress any backlash which may occur at the travel end between the roller 68 and the groove of the master 65, backlash which would result in a shift between the rotation of the workpiece 3 to be threaded and the feed travel of the cutting tool 9.

On the auxiliary slide 69 is hinged a flap or rectangular support 73 adapted to pivot on one of its sides around a horizontal axis X—X under the action of a pusher 74 carried by the upper slide 29 and actuated by the flat cam 66 by the intermediary of a bell-crank lever 75 pivoted on the slide 29. The pusher 74 comprises a roller 76 which rolls on a longitudinal face 77 of the support 73, with which it is maintained in contact by means of a spring 78 bearing on the auxiliary slide 69. The support 73 comprises an arm 79 to which is fastened in a longitudinally adjustable manner a horizontal shaft 80 at the end of which, opposite the spindle 2, is mounted a thread cutting tool 9. The master 65, which is interchangeable, is chosen so that the travel imparted by it to the tool 9 is equal to the length of the thread to be cut, while the cam 66, which is also interchangeable, is chosen according to the desired radial depth of the cut.

The operation of the described thread cutting lathe is as follows:

The lathe being in its rest position, shown on FIGS. 1 and 2, the lower slide 26 is at the end of its stroke in the direction of the arrow R and the upper slide 29 is at the end of its stroke in the direction of the arrow S, positions for which the tool 9 is entirely longitudinally and transversely disengaged from the spindle 2. Moreover, the auxiliary slide 69 of the thread cutting device F is at the end of its stroke in the direction of the arrow T, position corresponding to the beginnng of a cut of the tool 9. The pivoting support 73 occupies its extreme position in the direction of the arrow U, corresponding to the disengaged position of the tool 9 and determined by the minimum lift height of the machining cam 66 and the length of the arms of the bell-crank lever 75.

The operator mounts then on the cam-shaft 13 cams especially designed for the two threads to be cut, that is a grooved cam 12 controlling the clutch E, cams 32 and 37 controlling the displacements of the slides 26 and 29 and a cam 100 controlling the axial displacements of the movable part 97 of the double clutch. Said four cams are designed and secured to the cam-shaft 13 so as to have the operations which they control interconnected in the course of one revolution of the cam-shaft 13, that is to say to have the parts of the clutch E and of the double clutch engaged or disengaged according to a predetermined cycle controlled during one complete revolution of the cam-shaft 13. Likewise, the displacements of the slides are carried out according to a predetermined operation cycle and with an amplitude determined by the dimensions of the two threads to be cut. The rotation speed to impart to the horizontal shaft 45 of the thread cutting device and thus the transmission ratio connecting the spindle 2 with said shaft 45 are a function of several factors:

(1) rotation speed of the spindle 2
(2) pitch of the thread to be cut
(3) pitch of the face 72 of the groove of the machining cam 65 (master) controlling the longitudinal cutting feed of the tool 9.

The speed of the spindle 2 is determined by the cutting speed chosen by the operator and by the diameter of the thread to be cut, moreover the pitch of the face 72 of the groove of the machining cam is determined by the length of said thread. By taking into consideration said predetermined two factors, the operator chooses a transmission ratio of the mechanical connection connecting the spindle 2 with the thread cutting device F, such as to impart to the horizontal shaft 45 and to the machining cams 65 and 66 a speed allowing to carry out the pitch of the thread to be cut. For the first thread to be cut the operator mounts on the lathe gear wheels 49, 50 and 51 of the first gear train 46, for example, giving the transmission ratio corresponding to the pitch of said first thread, then he mounts gear wheels 91, 92, 96 of the second gear train 90 giving the transmission ratio corresponding to the pitch of the second thread to be cut. The operator mounts then on the horizontal shaft 45 of the thread cutting device F a "master" cam 65 the stroke (or lift) of which is equal to the length of the thread to be cut and a machining cam 66 the lift of which, combined with the length of the arms of the bell-crank lever 75, imparts to the flap 73 and consequently to the tool 9 a radial displacement equal to the desired depth of cut increased with a safety value (for example .004 in. to .008 in.) to avoid the rubbing of the tool on the external surfaces of the thread during the return stroke. Said two machining cams 65 and 66 are utilized for the two threads to be cut successively. The setting angle of said two cams 65 and 66 on the horizontal shaft 45 is designed, with respect to the setting angle of the cams carried by the cam-shaft 13, so as to co-ordinate the action timing of said various cams so that the various operations follow one another in the wanted order.

The operator starts then the motor of the lathe, not shown, driving, on the one hand, the spindle 2 at the speed chosen by the operator according to the cutting speed and the diameter of the thread to be cut and, on the other hand, the cam-shaft 13, which performs a single revolution during the successive cutting of both threads of the workpiece 3.

The flat cams 32 and 37 actuate the lower slide 26 and upper slide 29 by the intermediary of the mechanical members 34 to 36, respectively 38 to 43, causing the rapid transversal and longitudinal approach travels, in the opposite direction of the arrows R and S, which bring the slides 26 and 29, thus the thread cutting device F, into working position for the beginning of the first thread.

The length m of the shaft 80 carrying the threading tool 9 is designed so that, for said working position of the thread cutting device F, the cutting edge of the tool 9 is placed in a plane perpendicular to the spindle axis and going through the beginning of the thread to be cut.

As soon as the tool 9 occupies said work beginning position, the grooved cam 12 actuates the clutch E of the driving shaft 7, 7a to establish the kinematic connection between the spindle 2 and the thread cutting device F. Then, assuming that the speed of the horizontal shaft 45 of the thread cutting device F designed by the operator for cutting the first thread is obtained in utilizing the first gear train 46 driven by the spindle 2, the control cam 100 causes, by the intermediary of the levers 103 and 108 and of the rod 114, the engagement of the clutch 98, 98a connecting the wheel of the first gear train 46 to the outgoing shaft 48 of the two gear trains 46 and 90, as represented in FIG. 1.

The cam 66 imparts to the tool 9, by the intermediary of the members 73 to 77, an engaging transversal displacement up to the radial depth of cut chosen by the operator, then the master 65 imparts to the tool a cutting feed by the intermediary of the members 67 to 70.

As soon as the tool has completed the first cut, the cam 66 causes the radial disengagement of the tool, by the intermediary of the members 73 to 77 and of the spring 78, while the master 65, the action of which is combined with the thrust of the spring 71 on the auxiliary slide 69, causes the rapid return of the tool back to its work beginning position.

At this moment the flat cam 32 of the cam-shaft 13 imparts to the transversal slide 26 a slight feed so as to displace radially the tool 9 by the required quantity to bring said tool into work beginning position for the second cut. The cuts follow then one another in the same way up to the completion of the first thread.

To proceed then to the second thread cutting the grooved cam 12 controls the disengagement of the two parts 10 and 11 of the clutch E and thus breaks off the mechanical connection between the spindle 2 and the thread cutting device F. The machining cams 65 and 66 of said thread cutting device F are then in their rest position shown on the drawing, then the flat cams 32 and 37 of the cam-shaft 13 displace the carriage C transversely and longitudinally up to a second working position of the carriage for which the tool 9 occupies a position corresponding to the work beginning for the second thread. The control cam 100 carried by the cam-shaft 13 actuates then, by the intermediary of levers 103 and 108 and of the rod 114, the movable part 97 of the double clutch so as to cause the disengagement of the clutch 98, 98a and the engagement of the clutch 99, 99a, while the grooved cam 12 controls the re-engagement of the two parts 10 and 11 of the clutch E. Thus, the thread cutting device F is now connected to the spindle 2 by the intermediary of the second gear train 90, the transmission ratio of which permits transmitting to the machining cams 65 and 66 the speed chosen by the operator for the cutting of the second thread. From that moment the tool 9 begins the first cut of the second thread and the cuts follow then one another in the same way as above described up to the completion of said second thread.

When said second thread is completed, the grooved cam 12 causes the disengagement of the two parts 10 and 11 of the clutch E to disengage the mechanical connection between the spindle and the thread cutting device F. The machining cams 65 and 66 come to a stop in their rest position, shown on the drawing, then the flat cams 32 and 37 actuating the slides bring, by completing their revolution, the slides 26 and 29 of the carriage C in the direction of the arrows R and S back to their rest position represented on the drawing. The spindle 2 of the lathe is then immobilized by known means (not shown) so as to allow the withdrawing of the machined workpiece and the mounting in the chuck 4 of a new workpiece 3 to be threaded.

It is known that in the common automatic thread cutting lathes comprising a cross-slide carriage the upper slide on which is fixed the cutting tool travels transversely and not longitudinally as in the described lathe. Moreover, the tool is fixed directly on the upper slide and all its displacements in the axial direction and in the radial direction of the piece to be threaded, required for the machining operation, are transmitted to it by the longitudinal and transversal slides of the carriage. On said lathes it is possible to cut in a single operation two threads having different diameters by utilizing a tool having two cutters radially and axially shifted and working simultaneously, however, said threads must necessarily present the same pitch as the two cutters are integral one with another and are working as a body. Said lathes present moreover the drawback that the relatively heavy masses of the slides, and particularly of the longitudinal slide, have to be displaced between each cut in order to reset the tool every time into starting position, what slows down the operation, leads to a rapid wear of the movable members and limits the precision of the work.

The present invention, on the contrary, has the great advantage of allowing to machine successively, with the aid of the same tool, two co-axial threads having different pitches and possibly different diameters in one and the same cycle of operations, by utilizing two different transmission ratios for the tool movements required for carrying out the first then the second thread. Moreover, only the relatively light mechanical pieces are set in movement during the machining, except for the slight radial feed of the transversal slide between the successive cuts, which allows one to machine both threads with rapidity and precision.

Figure 3:
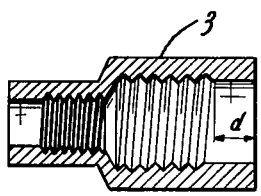
FIG. 3 is a sectional view of a threaded piece having two internal threads of different diameter and pitch.

The description of the operation of the automatic lathe according to the invention related to the cutting of external threads. On cutting internal threads, such as represented for example in FIG. 3, the plane perpendicular to the axis of the spindle 2 going through the beginning of the thread to be cut may be located at a distance $d$ inside the workpiece to be threaded. On the other hand the shaft 80 is adjusted on the arm 79 so as to present a free length $m$ at least equal to the total depth of the two threads to be cut, so that the tool 9 can arrive at the end of the cut of the second thread without the arm 79 abutting on the piece to be threaded. The tool 9 itself is turned over on the shaft 80 so that its cutting edge, which in this case attacks the rear part of the internal thread, is fitted according to the direction of rotation of the spindle 2.

I claim:

1. An automatic lathe comprising a spindle, means connected to said spindle to drive same, a cross-slide carriage having transverse and longitudinal slides, a cam shaft having mounted thereon first and second flat cams, one of said flat cams being operatively connected to said transverse slide to move said transverse slide transversely with respect to said spindle while the other of said flat cams is operatively connected to said longitudinal slide to move said longitudinal slide along an axis parallel to said spindle, a thread cutting device being mounted on said longitudinal slide; said thread cutting device including a machine cam shaft disposed parallel to said cam shaft, first and second machining cams mounted on said machine cam shaft, an auxiliary longitudinal slide mounted on said longitudinal slide, said first machining cam having a groove therein, a finger having one end connected to said auxiliary longitudinal slide while the other end rides in said groove of said first machining cam to longitudinally move said auxiliary longitudinal slide relative to that of said longitudinal slide upon movement of said first machining cam, a flap member having one end pivotally mounted on said auxiliary longitudinal slide, a thread cutting tool mounted on the outside surface of said flap member, a pusher member movably mounted in said longitudinal slide adjacent said second machining cam and having one end engaging said flap member, a bell-crank lever pivotally mounted on said longitudinal slide between the other end of said pusher member and said second machining cam to be operated thereby to move said flap member and thread cutting tool thereon radially; a plurality of interchangeable gear trains having different transmission ratios operatively connected to said spindle to be driven thereby, a selectable clutch mechanism operatively connected to said interchangeable gear trains to engage one of said interchangeable gear trains, driving means disposed between said machine cam shaft and said interchangeable gear trains to drive said machine cam shaft, and selectable means connected to said clutch mechanism to select one of said interchangeable gear trains.

2. An automatic lathe according to claim 1 in which said selectable means includes another cam being mounted on said cam shaft, a first arm pivotally mounted on a further shaft parallel to said cam shaft and having one end engaging said other cam, a second arm pivotally mounted parallel to said cam shaft and having one end connected to the other end of said first arm, a toothed sector pivotally mounted in the same plane as said second arm and engaging a further toothed sector of the other end of said second arm, and a movable rod having one end pivotally connected to said toothed sector and the other end connected to said clutch mechanism.

3. An automatic lathe according to claim 1 in which said clutch mechanism includes an outgoing shaft having mounted freely and rotatably thereon a final gear of each of said interchangeable gear trains, a double clutch movably mounted on said outgoing shaft to be axially movable between said interchangeable gear trains, said double clutch being angularly secured to said outgoing shaft.

4. An automatic lathe according to claim 1 in which said interchangeable gear trains include a driving shaft operatively connected to said spindle, a secondary shaft disposed along the same axis as said driving shaft, a clutch interconnecting said driving shaft and said secondary shaft, operating means connected to said clutch to interconnect said driving shaft and said secondary shaft, a first and second gear wheel mounted on said secondary shaft in spaced relationship, an outgoing shaft disposed parallel to said secondary shaft, first and second final gear wheels freely mounted on said outgoing shaft in spaced relationship, a first intermediate gear wheel freely mounted on an intermediate shaft parallel to said secondary and outgoing shafts and meshing with said first and first final gear wheels, and a second intermediate gear wheel freely mounted on an adjustable intermediate shaft parallel to said secondary and outgoing shafts and meshing with said second and second final gear wheels.

5. An automatic lathe according to claim 4 in which said operating means includes a grooved cam having a groove therein and being mounted on said cam shaft, a first lever having one end secured to a rotatable shaft parallel to said cam shaft and the other end containing a portion which rides in said groove of said grooved cam, a rod having one end pivotally mounted to said one end of said first lever, a further rotatable shaft disposed parallel to said cam shaft having a second lever connected to one end thereof which engages said clutch, and a sector member connected to the other end of said further rotatable shaft and being pivotally connected to the other end of said rod.

6. An automatic lathe according to claim 1 in which said driving means include a shaft having one end connected to a universal joint at said interchangeable gear trains and the other end connected to a further universal joint mounted in a bearing on said cross-slide carriage, spline means interposed in said shaft to enable said cross-slide carriage to move longitudinally relative to spindle.

7. An automatic lathe for cutting threads of different diameter and pitch on a workpiece comprising a bed, a spindle for carrying said workpiece mounted for rotation on said bed, motive means for rotating said spindle, a cross-slide carriage having transverse and longitudinal slides mounted on said bed and being spaced from said spindle a cam shaft rotatably mounted on said bed having first and second flat cams disposed thereon, means connected to said motive means for rotating said cam shaft, means connected between one of said flat cams and said transverse slide to move said transverse slide transversely with respect to said spindle, means connected between the other of said flat cams and said longitudinal slide to move said longitudinal slide along an axis parallel to said spindle, a thread cutting device having a thread cutting tool mounted thereon, said thread cutting device being mounted on said cross-slide carriage, a plurality of interchangeable gear trains having different gear ratios mounted on said bed, means connected between said spindle and said interchangeable gear trains to drive said interchangeable gear trains, a clutch mechanism operatively connected to said motive means as well as being disposed in said means to drive said interchangeable gear trains to automatically connect and disconnect said drive means with respect to said interchangeable gear trains, a selectable clutch mechanism disposed between said interchangeable gear trains to engage one of said interchangeable gear trains, selectable means operatively connected to said motive means as well as being connected to said selectable clutch mechanism to automatically move said selectable clutch mechanism between said interchangeable gear trains, and connecting means interconnecting said interchangeable gear trains and said thread cutting device to operate said thread cutting device for cutting threads of different diameter and pitch.

References Cited in the file of this patent

UNITED STATES PATENTS

| | | |
|---|---|---|
| 1,106,250 | Spear | Aug. 4, 1914 |
| 2,388,779 | Boehmler | Nov. 13, 1945 |
| 2,468,478 | Ardoin et al. | Apr. 26, 1949 |
| 2,622,252 | Wernli | Dec. 23, 1952 |
| 2,768,393 | Sayce | Oct. 30, 1956 |
| 2,884,653 | Hahn | May 5, 1959 |